July 9, 1940.  R. D. WHIPPLE  2,207,647
THERMOCOUPLE
Filed Oct. 7, 1939
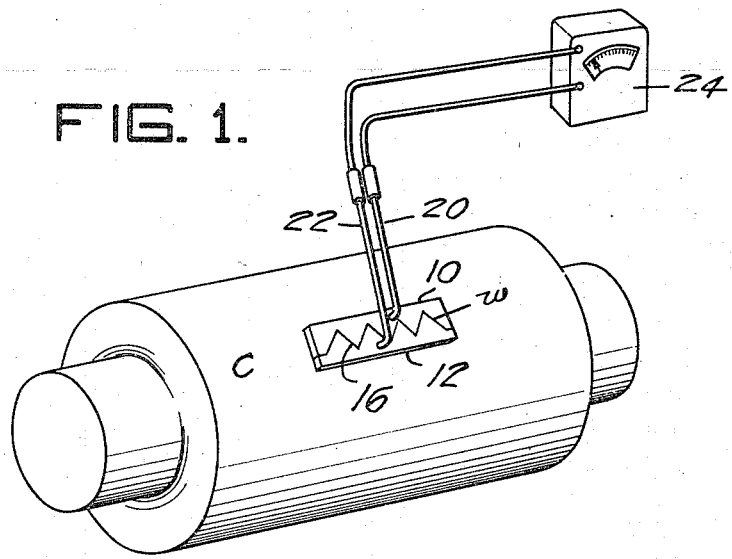
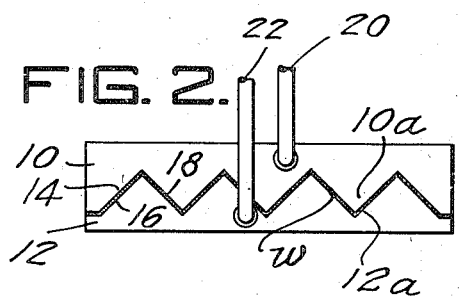
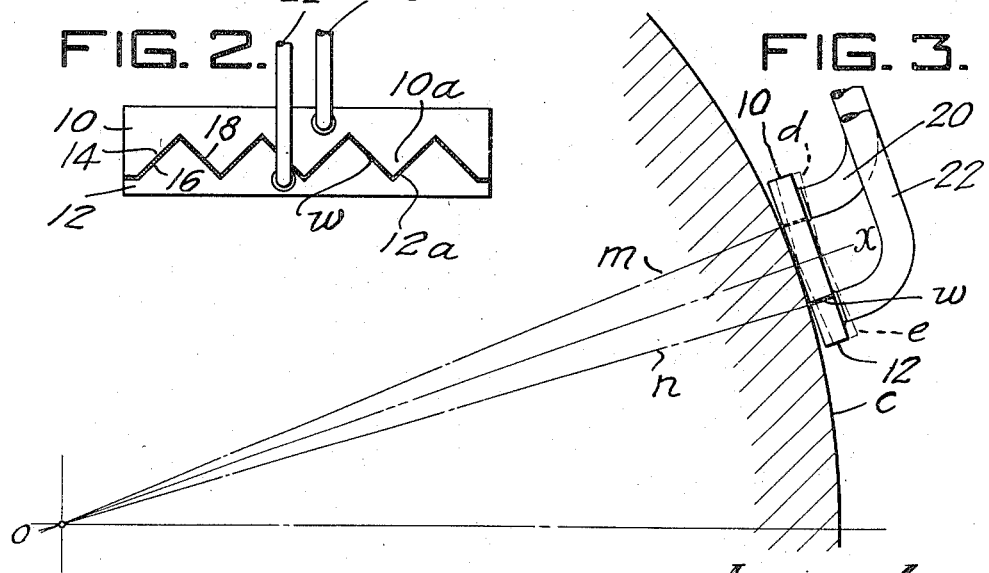
Inventor:
RUSSEL D. WHIPPLE,
by: John E. Jackson
his Attorney.

Patented July 9, 1940

2,207,647

UNITED STATES PATENT OFFICE 2,207,647

THERMOCOUPLE

Russel D. Whipple, Oakley, Calif.

Application October 7, 1939, Serial No. 298,510

4 Claims. (Cl. 136—4)

This invention relates to improvements in thermocouples of special design and arrangement to adapt them for the measurement of temperatures of revolving cylindrical members. One object of the invention is to provide a thermocouple so constructed and arranged that the junction of the two dissimilar metals thereof follows an undulating zig-zag line so that it is unnecessary to exercise great care in mounting the thermocouple in a single positive position.

Heretofore, the dissimilar metals of thermocouples have been united along a straight line, and this has required extreme accuracy in mounting the same at proper coaction with cylindrical objects such as mill rolls or the like. In the event that prior art thermocouples are mounted or eventually become slightly skewed, inaccurate temperature determinations result. The thermocouple of the present invention overcomes this difficulty in a simple yet effective way. For a complete understanding of the invention, reference is to be made to the following detailed description, the accompanying drawing, and the appended claims.

In the drawing, Figure 1 is a perspective view of a mill roll showing my improved thermocouple in position for measuring the temperature thereof.

Figure 2 is an enlarged plan view of the thermocouple showing the improved juncture between the dissimilar metals thereof.

Figure 3 is an enlarged sectional view through a portion of a mill roll showing the thermocouple in full lines, mounted in operative position for measuring the temperature of a rotating cylindrical member such as a mill roll, and indicating in dotted lines an allowable variation of the positioning of the couple with respect to the roll without interfering with its proper functioning.

Referring in detail to the drawing, 10 represents a conventional roll such as one used in the roll stands of sheet and tin mills. It is desirable in the operation of such mills to provide means for accurately determining the roll temperatures at various times, and the present invention provides an improved type of thermocouple which, while not limited thereto, is well suited for such use. Heretofore the dissimilar metals of conventional thermocouples have been joined along a straight line. With such a straight line of juncture, in order to have the thermocouple operate satisfactorily in measuring temperatures of cylindrical surfaces, great care and accuracy is necessary to insure that the contacting surface of the thermocouple shall be exactly normal to the plane of the cylindrical surface of the object rolled whose temperature is being taken. It is also necessary, in the case of straight-line contact thermocouples, that the line of juncture be exactly parallel with the axis of the cylindrical roll. If conventional thermocouples become slightly dislodged after use, or if they are not initially positioned very accurately, difficulty is experienced in securing proper temperature readings.

To overcome the above difficulties, the thermocouple of the present invention is formed of two dissimilar metal elements 10 and 12 which, as shown, are flat plate-like members whose contiguous faces 14 and 16 are united along an undulating or zig-zag line such as indicated at 18.

The thermocouple operates on the known principle of conventional thermocouples through the heated junction of two dissimilar metals establishing an electromotive force which may be measured by numerous methods, the current generated being proportional to the temperature in the heated junction. The thermocouple illustrated includes conductor leads 20 and 22 connected respectively with the dissimilar metal plate elements 10 and 12, said leads being connected with a galvanometer or other conventional indicating device shown at 24. The dissimilar flat plate elements 10 and 12, as shown, are disposed in the same plane and may be made of metals possessing the characteristics of those ordinarily employed in the construction of thermocouples. For example, one element may be made of iron and the other of the metal alloy known to those skilled in the art as constantan.

The undulating or zig-zag line of the weld metal $w$ which forms the juncture between the dissimilar metals provides a construction including finger-like projections 10a which extend into indentations 12a. Otherwise expressed, the staggered line of juncture is such that there are interdigitated portions of the dissimilar metals located in the same plane. As thus arranged, the thermocouple will satisfactorily coact with a cylindrical surface even though the undersurface thereof is not normal or tangent to a radial line passing through the longitudinal center line of the thermocouple. This will be clear from Figure 3, in which the line $o-x$ is a radial line through the roll axis and cutting the longitudinal center line of the thermocouple. As illustrated in Figure 3 in full lines, the longitudinal center line of the thermocouple coincides with such radial line and its central contacting surface is therefore exactly tangent with the circumference c of the mill roll. The radial lines o—n and o—m in Figure 3 indicate the amount of angular overlap of the projections and depressions in the dissimilar metal portions 10 and 12 of the thermocouple. Thus it is clear that the same can be fulcrumed or rocked bodily on the surface of the cylinder to the angular position shown in dotted lines in Figure 3 and yet both portions 10 and 12 will have proper contact with the cylindrical roll or other curved article whose temperatures is to be measured. In thermocouples of the prior art, in which the dissimilar metals are joined along a straight line, a truly tangent relationship must be maintained between it and the cylinder whose temperature is to be taken. With the thermocouple of the present invention, such great accuracy need not be maintained. In fact, the thermocouple can be shifted either way by fulcruming on the periphery of the roll to the angular position indicated by the dotted lines d and e. Or the thermocouple of the present invention may be shifted out of a line parallel with the roll axis and yet provide means for giving accurate temperature indications because at all times there will be some portions of the overlapping projections of the dissimilar parts in a plane corresponding to the optimum plane of contact. In short, the zig-zag overlap provides zones of dissimilar metal which are always in proper contact with a heated roll whose temperature is to be measured.

While I have described quite precisely the particular embodiment of the invention herein illustrated, it is to be understood that the drawing and description are to be interpreted in an illustrative rather than a limiting sense.

I claim:

1. A thermocouple for use in determining temperatures of curved surfaces, comprising two dissimilar metal elements disposed in a common plane and joined at their contiguous edges along an undulating line.

2. A thermocouple for use in determining temperatures of rotating curved members comprising two dissimilar metal plates disposed in the same plane and formed with interdigitated portions united at their contiguous edges.

3. A thermocouple for use in determining temperatures of rotating cylindrical members comprising a substantially flat element composed of two dissimilar flat metal plates welded together, united at their contiguous edges along an undulating line.

4. A thermocouple for use in determining temperatures of rotating cylindrical members comprising two cooperating plates of dissimilar metals, their contiguous edges being so formed as to provide projections on the one which interfit with depressions on the other to thus provide interdigitated portions in the same plane whereby the thermocouple is adapted for proper coaction with a moving cylinder, so that regardless of slight misalignment of the longitudinal axis of the thermocouple with a line on the cylinder parallel to the axis thereof, said interdigitated portions at different points along the length of the thermocouple will properly contact with the cylindrical surface so as to thereby insure the securing of accurate temperature readings.

RUSSEL D. WHIPPLE.